Dec. 15, 1925.  
C. A. McMUNN  
CABLE CLAMP  
Filed Feb. 19, 1925  
1,566,153
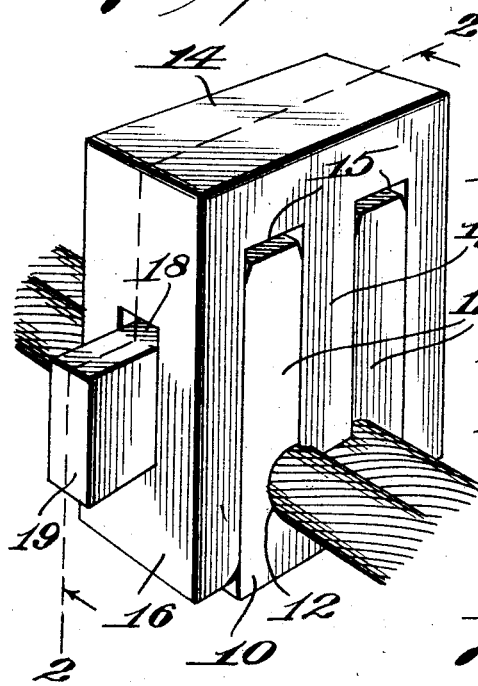
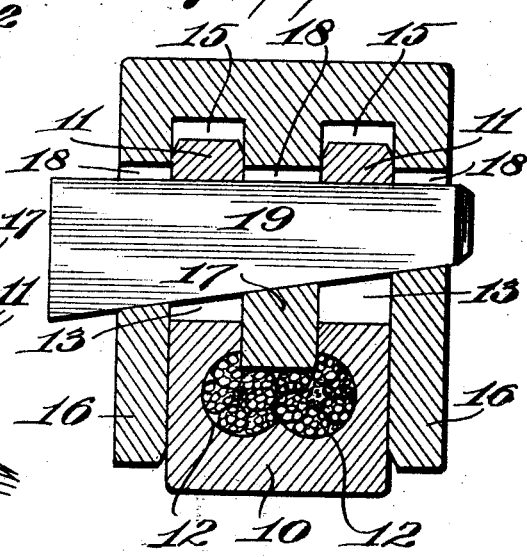
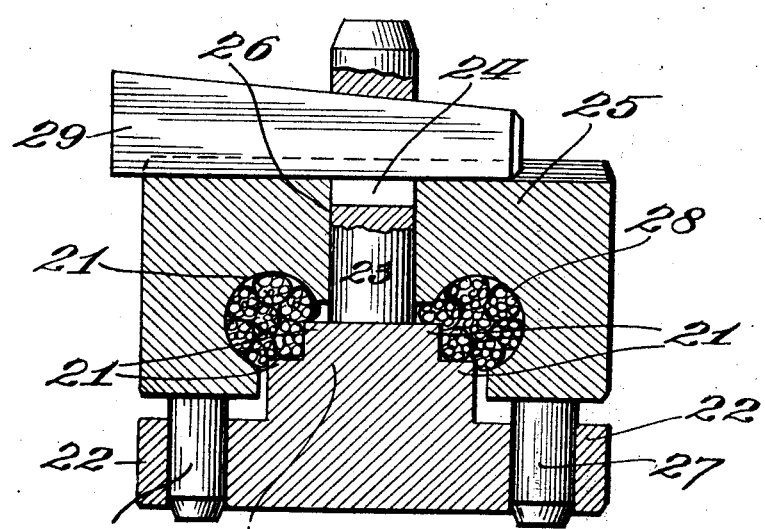
INVENTOR:—  
Charles A. McMunn  
By Martin P. Smith, Atty Patented Dec. 15, 1925.

1,566,153

UNITED STATES PATENT OFFICE.

CHARLES A. McMUNN, OF ANAHEIM, CALIFORNIA.

CABLE CLAMP.

Application filed February 19, 1925. Serial No. 10,229.

*To all whom it may concern:*

Be it known that I, CHARLES A. MCMUNN, a citizen of the United States, residing at Anaheim, in the county of Orange and State of California, have invented certain new and useful Improvements in Cable Clamps, of which the following is a specification.

My invention relates to improvements in cable clamping devices, and has for its principal objects, the provision of a strong, substantial clamp that may be easily and quickly applied for use and which will be very effective in performing its intended functions.

Further objects of my invention are, to generally improve upon and simplify the construction of the existing forms of cable clamps; to provide a device of the character referred to that is relatively simple in construction, capable of being easily and cheaply produced and which consists of but two parts besides the wedging element that is used for drawing the parts into clamping engagement with the cable.

With the foregoing and other objects in view, my invention consists in certain novel features of construction and arrangement of parts that will be hereinafter more fully shown and described and illustrated in the accompanying drawings in which:

Fig. 1 is a perspective view of a cable clamp of my improved construction.

Fig. 2 is a vertical section taken on the line 2—2 of Fig. 1.

Fig. 3 is a vertical section taken through the center of a modified form of the cable clamp.

Referring by numerals to the accompanying drawings and particularly to the construction illustrated in Figs. 1 and 2, 10 designates a metal block having on one side a pair of projecting plates 11 that are spaced a suitable distance apart and formed through said block is a pair of cable-receiving grooves 12 that communicate with each other and with the space between the inner ends of the plates 11.

Formed through the plates 11 are aligned slots or key ways 13, the same being disposed at right angles to the grooves 12.

The companion member of the clamp comprises a metal block 14 having a pair of spaced slots 15, thereby providing a pair of side plates 16, and an intermediate plate 17.

When the members of the clamp are assembled or fitted together, side plates 16 overlie the outer faces of plates 11, with the latter occupying grooves 15 and with the intermediate plate 17 positioned between said plates 11.

Intermediate plate 17 is shorter than the side plates 16, so that when the parts of the clamp are assembled, the end of said plate 17 enters the copper portions of the grooves 12 and bears on the cable sections seated therein.

Formed through plates 16 and 17 are aligned slots or key ways 18 that register with slots 13 when the clamp members are assembled and to draw the parts of the clamp together to grip the engaged cable sections, a wedge or key such as 19 is driven through the aligned slots 13 and 18. As the wedge or key is thus driven through the slots, the two parts of the clamp are forcibly drawn toward each other and the lower end of the plate 17 passes into the upper portions of the grooves 12 to "bite" into and firmly grip the cable sections that are seated therein.

In the modified construction illustrated in Fig. 3, a block 20 is provided at its upper outer corners with a pair of shoulders 21 and, at its lower corners with outwardly projecting perforated ears 22. A pin or post 23 projects upwardly from the center of block 20 and formed through said pin is a slot or key way 24.

The companion block 25 is provided with a centrally arranged aperture 26 that receives the pin 23, and depending from the underside of the block 20 near its ends are pins 27 that are adapted to enter the perforations in ears 22.

Formed in the underside of block 25 to the sides of the aperture 26 therein are cable-receiving grooves or seats 28, the same being positioned directly above the pairs of shoulders 21.

The blocks 20 and 25 are drawn toward each other so as to cause the shoulders 21 to engage and clamp the cable sections in grooves 28 by driving a wedge or key 29 across the top of block 25 and through the slot or key way 24.

Thus it will be seen that I have provided an improved cable clamp that is relatively simple in structure, capable of being easily and quickly applied for use, economical of manufacture and very effective in performing its intended functions.

It will be understood that minor changes in the size, form and construction of the various parts of my improved cable clamp may be made and substituted for those herein shown and described without departing from the spirit of the invention, the scope of which is set forth in the appended claims:

I claim as my invention:

1. A cable clamp comprising a block having a pair of plates spaced apart to form a slot, there being a pair of cable-receiving grooves formed at the lower end of said slot, a second block provided with a pair of slots that are adapted to receive the plates of the first mentioned block, the overlapping portions of the two blocks being provided with transversely aligned slots and a wedge key adapted to be driven through said aligned slots for drawing the blocks into clamping engagement with the cables that occupy said cable receiving grooves.

2. In a cable clamp, a block having a pair of cable-receiving grooves, a companion block having a portion that is provided with rectangular shoulders that are adapted to project into said grooves and a wedge key, adapted to be driven through one of said blocks and to bear on the other so as to forcibly move the two blocks into clamping engagement with the cables that are seated in said grooves.

3. A cable clamp comprising a pair of blocks, one of which is provided with a pair of cable-receiving grooves, the other block having angular shoulders that are adapted to enter said grooves, said blocks being provided with slots that are disposed at right angles to the cable-receiving grooves and a wedge key adapted to be driven through said slots so as to draw said blocks into clamping engagement with the cables to which they are applied.

In testimony whereof I affix my signature.

CHARLES A. McMUNN.